(12) United States Patent
Evans et al.

(10) Patent No.: US 11,833,500 B2
(45) Date of Patent: Dec. 5, 2023

(54) ADDITION SYSTEM FOR ADDING MATERIAL TO INDUSTRIAL PROCESSES

(71) Applicant: Johnson Matthey Process Technologies, Inc., Savannah, GA (US)

(72) Inventors: Martin Evans, Tolland, CT (US); Ashim Mukerjee, Garden City, GA (US); Gary Pauley, Garden City, GA (US); Rahul Prasad, Garden City, GA (US)

(73) Assignee: Johnson Matthey Process Technologies, Inc, Savannah, GA (US)

(*) Notice: Subject to any disclaimer, the term of this patent is extended or adjusted under 35 U.S.C. 154(b) by 48 days.

(21) Appl. No.: 17/597,260

(22) PCT Filed: Jul. 8, 2020

(86) PCT No.: PCT/US2020/041240
§ 371 (c)(1),
(2) Date: Dec. 30, 2021

(87) PCT Pub. No.: WO2021/007343
PCT Pub. Date: Jan. 14, 2021

(65) Prior Publication Data
US 2022/0314180 A1    Oct. 6, 2022

Related U.S. Application Data

(60) Provisional application No. 62/871,300, filed on Jul. 8, 2019.

(51) Int. Cl.
*B01J 8/00* (2006.01)
*C10G 11/18* (2006.01)

(52) U.S. Cl.
CPC ........... *B01J 8/003* (2013.01); *C10G 11/187* (2013.01); *B01J 2208/00539* (2013.01);
(Continued)

(58) Field of Classification Search
CPC . B01J 8/003; B01J 8/0035; B01J 8/006; B01J 2208/00548; B01J 2208/00619; B01J 2208/00752; C10G 11/187
See application file for complete search history.

(56) References Cited

U.S. PATENT DOCUMENTS 4,287,997 A * 9/1981 Rolfe ..................... B65D 19/08
220/23.6
8,146,414 B2 * 4/2012 Evans ..................... B01J 8/003
73/149

(Continued)

FOREIGN PATENT DOCUMENTS

WO         2009055222 A1    4/2009

*Primary Examiner* — Lessanework Seifu
(74) *Attorney, Agent, or Firm* — Kevin M. Carroll

(57) ABSTRACT

An addition system for introducing particulate material into an industrial process is disclosed. The addition system comprises a vessel for holding the particulate material, wherein the vessel has a top and a bottom; one or more weighing devices; a controller for controlling operation of the addition system; a base plate to support the vessel and optionally the controller; and three or more legs, each leg having an uppermost section that connects to the vessel and a foot that is connected to the base plate. The widest diameter of the vessel is less than the diameter of a circle drawn through the feet of the legs. The one or more weighing device are mounted on the base plate and support the legs of the vessel.

17 Claims, 5 Drawing Sheets

Addition System

(52) U.S. Cl.
CPC ............. *B01J 2208/00619* (2013.01); *B01J 2208/00752* (2013.01); *C10G 2300/4012* (2013.01)

(56) References Cited

U.S. PATENT DOCUMENTS

| | | | |
|---|---|---|---|
| 9,504,975 B2 * | 11/2016 | Yaluris | .................. B01J 8/0025 |
| 2002/0185317 A1 | 12/2002 | Paine | |
| 2011/0280769 A1 | 11/2011 | Yaluris et al. | |

\* cited by examiner

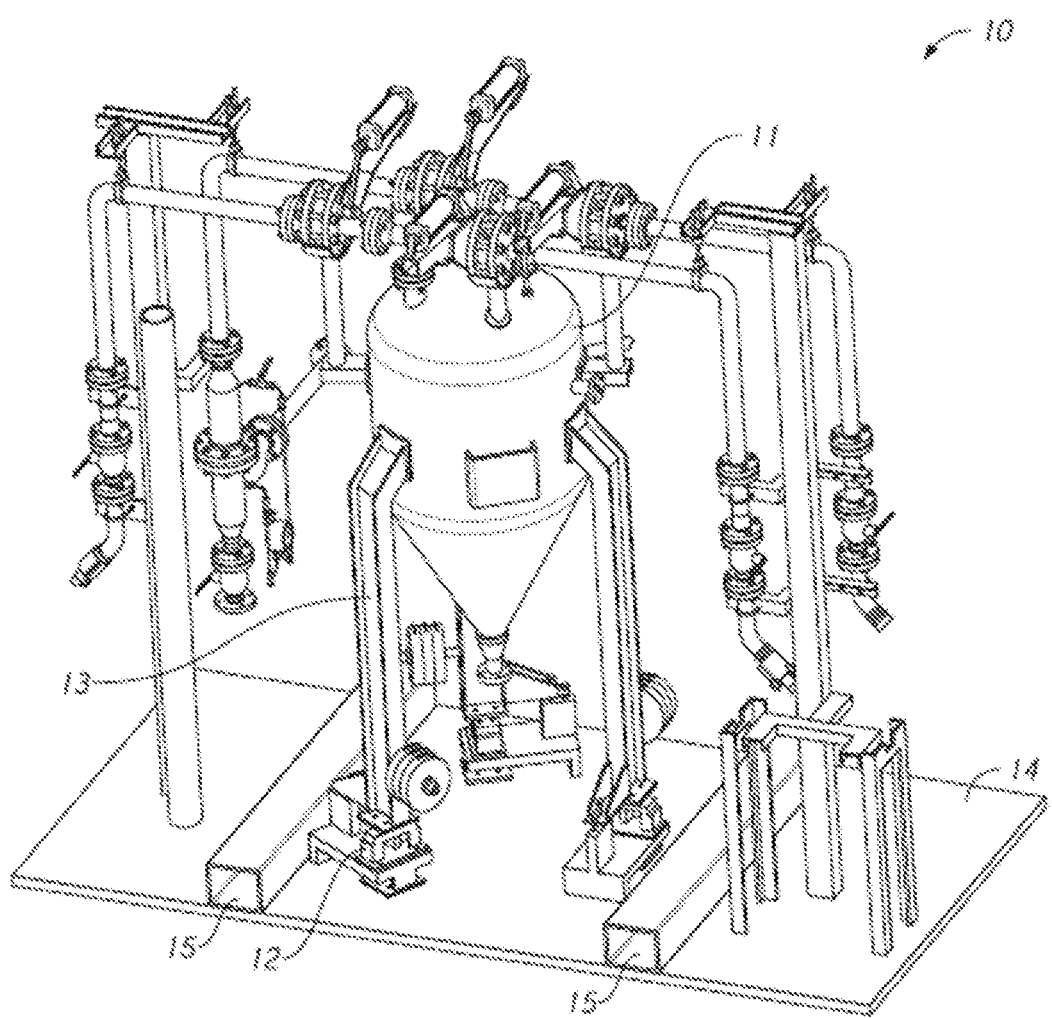
Figure 1: Addition System

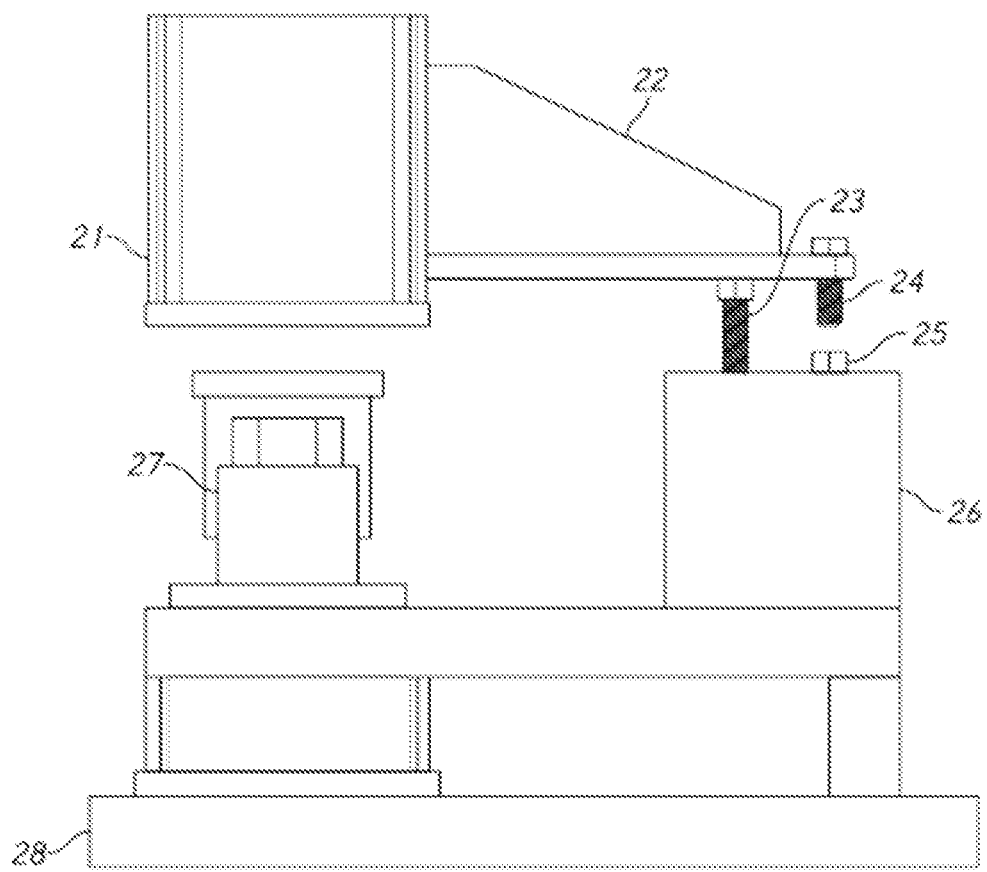
Figure 2: Jacking System

Figure 3: Horizontal Filter Arrangement
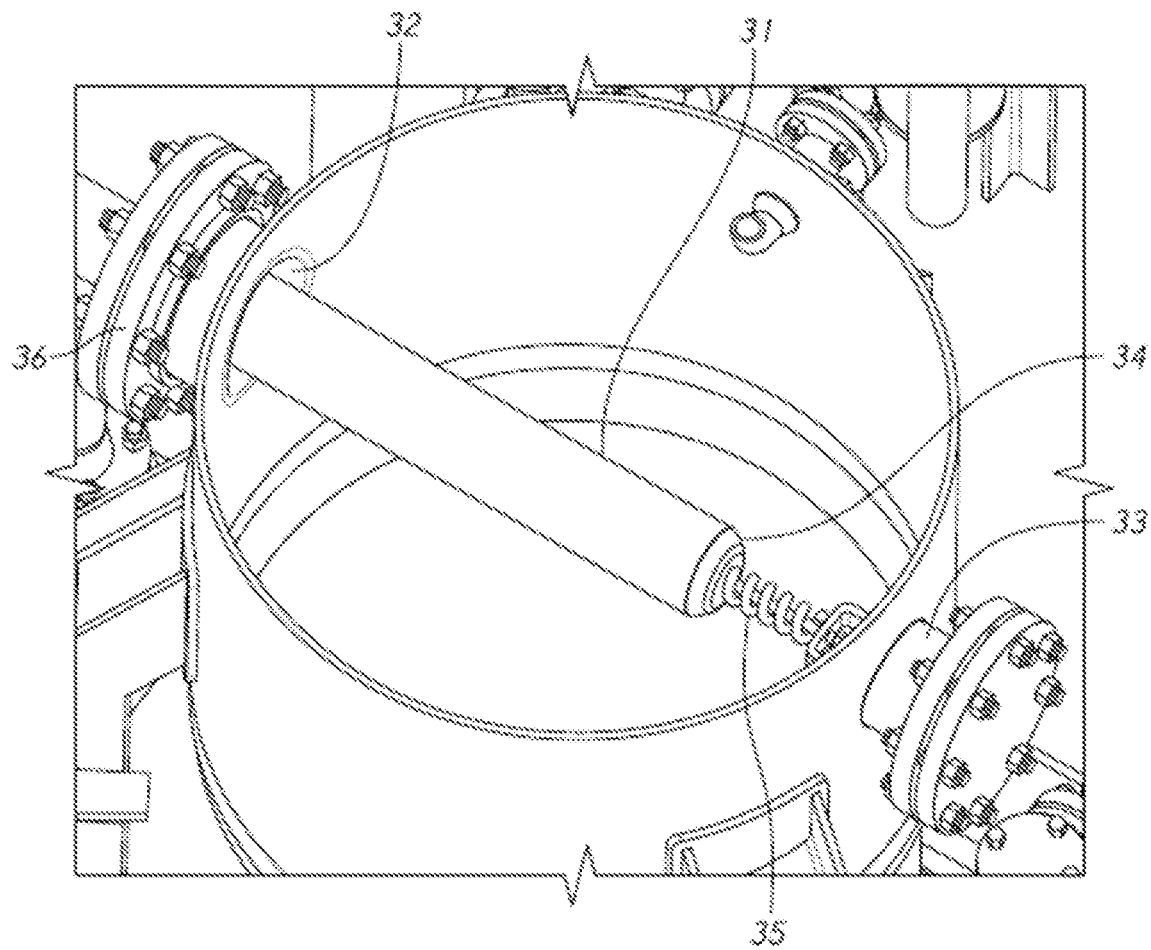

Figure 4. Alternative Horizontal Filter Arrangement
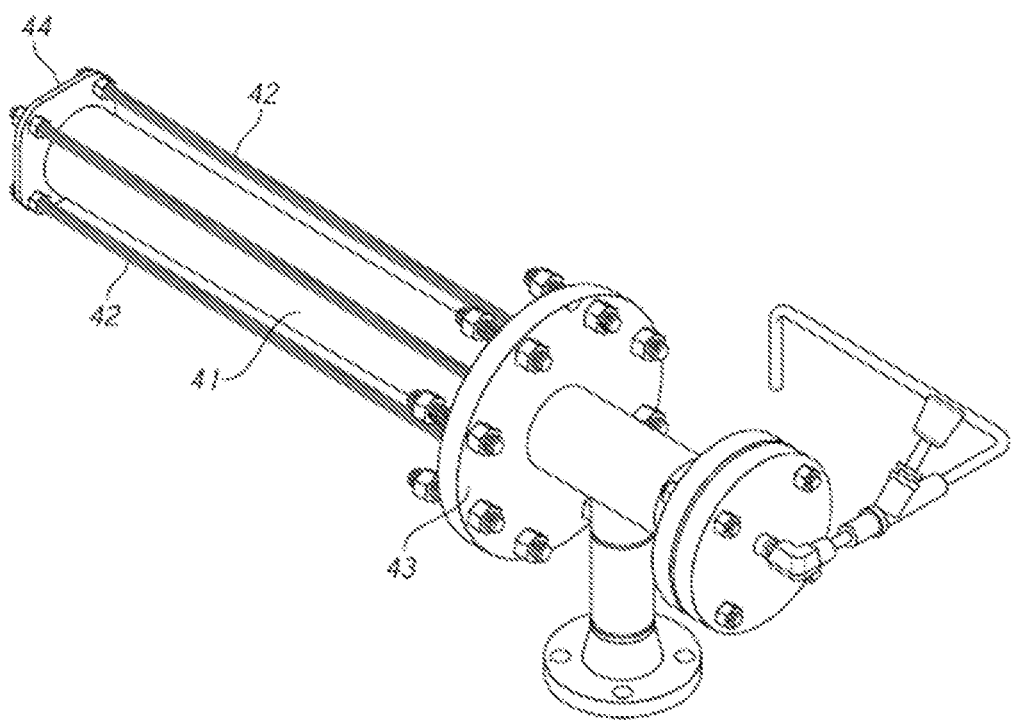

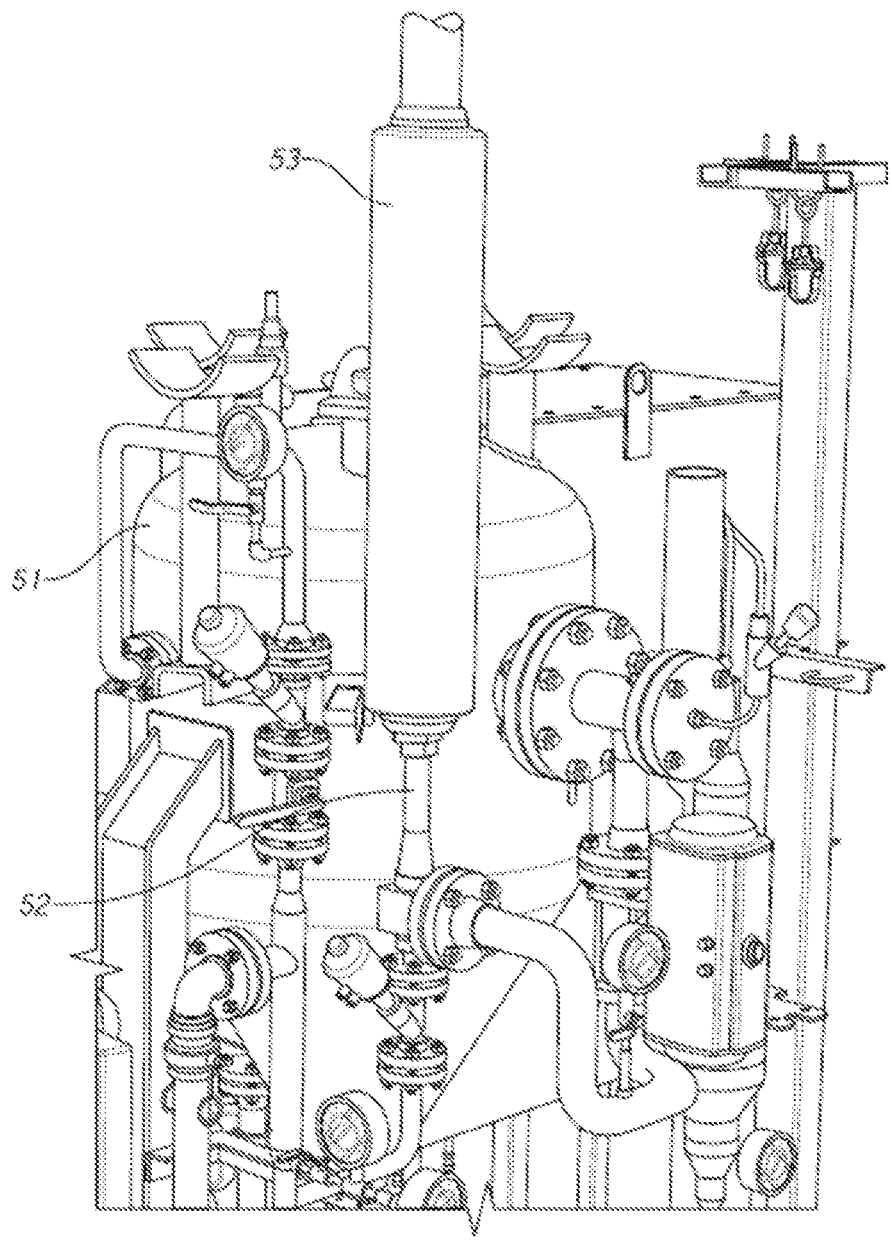
Figure 5: Vacuum Ejector

ADDITION SYSTEM FOR ADDING MATERIAL TO INDUSTRIAL PROCESSES

FIELD OF THE INVENTION

The invention is an addition system for adding particulate matter to industrial processes, such as a fluid catalytic cracking ("FCC") process, particularly where powder needs to be added in a controlled manner.

BACKGROUND OF THE INVENTION

Refiners and other industrial manufacturers add powdered catalyst and additives to their processes at rates from about 9 to over 20,000 kg/day (20 lb/day to over 20 tons/day) from addition system loaders. It is important to be able to obtain accurate weight readings from the loaders in order to determine how much catalyst and/or additives are added to a process unit, such as a FCC unit. On larger loaders (capacity ranges from 1.4 to 127 kL (50 to 4,500 ft$^3$)), the loaders are commonly supported on three legs to obtain an even weight distribution and stable weight reading. On these loaders the loadcells are generally placed one under each leg.

On other loaders (see, for example U.S. Pat. No. 9,504,975), the vessel comprises legs that are secured to a metal plate, and the plate is mounted on loadcells. This adds a measure of stability, but it is still not an ideal solution as the design is very susceptible to weight changes due to wind impinging on the vessel from the side. The loading unit of U.S. Pat. No. 9,504,975 includes a cabinet for housing the loading unit, which can protect the loader from the wind and weather.

On some smaller loaders (less than about 285 L (10 ft$^3$) capacity), the vessel is suspended from the roof of the entire loader assembly or skid, with a loadcell (in tension) on each of the three suspension arms. This design suffers from extreme difficulty in getting a stable weight reading, as the adjustment of the loadcell suspension fittings (which are easy to set up in a shop) is too complicated to maintain in the field. This is because outside forces, vibration, pipe and hose expansion and contraction under load, and other forces caused alignment issues which lead to outside stresses affecting the measured weight.

On more recent designs, the loadcells are relocated to the side of the vessel and put back into compression mode. However, it was found that small amounts of flexibility in the metal frame that housed the entire loader led to short-term fluctuations in the weight readings due to flexing of the support beams of the metal frame, such as when an operator walks on the base of the frame.

It is still desirable to attain an improved addition system to more accurately measure the amount of catalyst and additives added into industrial processes, including the FCC process. We have discovered a new addition system for adding catalyst and additives into industrial processes. The enhancements made in this new design allow small addition system vessels to be used to add much larger amounts of catalyst, more reliably and accurately than previously possible.

SUMMARY OF THE INVENTION

The invention includes an addition system for introducing particulate material into an industrial process. The addition system comprises a vessel for holding the particulate material, wherein the vessel has a top and a bottom; one or more weighing devices; a controller for controlling operation of the addition system; a base plate to support the vessel and optionally the controller; and three or more legs, each leg having an uppermost section that is attached to the vessel and a foot that is connected to the base plate. The widest diameter of the vessel is less than the diameter of a circle drawn through the feet of the legs. Each foot is connected to the base plate through one of the weighing devices which are mounted on the base plate and support the feet of the vessel.

BRIEF DESCRIPTION OF THE DRAWINGS

FIG. 1 shows an embodiment of the addition system of the invention.

FIG. 2 shows an embodiment of a jacking system.

FIG. 3 illustrates one arrangement of a horizontal filter in the addition system.

FIG. 4 shows an alternative arrangement of the horizontal filter.

FIG. 5 shows an ejector vacuum.

DETAILED DESCRIPTION OF THE INVENTION

The invention includes an addition system for introducing particulate material into an industrial process. Preferable industrial processes include manufacture of pyridine and its derivatives, the manufacture of acrylonitrile, fluid catalytic cracking (FCC) processes, and other chemical manufacturing processes. The invention is particularly suited to introduce particulate material into a fluid catalytic cracking (FCC) process.

The addition system comprises a vessel for holding the particulate material. The vessel has a top and a bottom. Preferably, a quick-release hatch may be located on the top or a side of the vessel. The quick-release hatch is preferably hinged in order to allow easy opening and closing of the hatch during and following internal access to the vessel.

The bottom of the vessel is preferably cone-shaped in order to allow easy flow of the particulate material out of the vessel for movement into the industrial process, with a cone angle of between 45 and 60 degrees being preferred, although other shapes (such as dished ends) can be used.

The vessel is preferably sized to contain less than about 225 kg (about 500 lb) of particulate material, more preferably less than about 135 kg (about 300 lb) of particulate material.

The addition system also comprises one or more weighing devices. Preferably, the weighing device comprises one or more load cells.

The addition system also comprises a controller, which is preferably a CPU (central process unit) or a micro-PLC (programmable logic controller), and more preferably a micro-PLC. The controller can be connected to an automated database, such as the Intercat AIM (Additive Inventory Management) database using a data link as for easy access to the data for the industrial process, or to a refinery DCS (distributed control system) system. Such connections include those described in U.S. Pat. Nos. 6,859,759, 7,050,944, 7,369,959, and others.

The addition system also comprises a base plate, which is preferably made of one solid plate of metal. The base plate supports the vessel, and optionally the controller. This base plate is much simpler than the complex metal beam support frame that is more conventionally used. The conventional design has the support frame completely surrounding the vessel. This is done to provide structural stability, and to provide support for ancillary equipment. Such a support frame is expensive to manufacture, and it has been found to provide insufficient structural stability to keep the weight readings stable enough for accurate control of additions.

Preferably, the base plate is a single metal slab, of an appropriate thickness for the service, providing stability of the weight readings and suitable for transporting the addition system without buckling the plate. To further increase the transportation stability, two or more cross members are preferably secured to the plate so that even under any impact loading there is no measurable deformation of the base plate. The base plate is preferably thick enough to provide adequate weight stability, while at the same time not being so thick that it is too expensive, or too heavy to be easily transported using (for example) a fork lift truck. It was found that the ideal thickness is between 1.9 to 3.8 cm (0.75 to 1.5 inch) thick for an addition system vessel with a capacity of between 57 to 708 L (2 to 25 ft$^3$).

Preferably, the base plate is rectangular in shape. The preferable length and width of the base plates are ideally between 1.5 to 3.1 m (5 to 10 feet) on each side. One side will normally be longer than the other to allow room for pipe supports and fittings on opposite sides of the loader vessel.

In a preferred configuration of the base plate, the two cross members are shaped and positioned on the base plate in such a way that a forklift or other lifting means can be used to lift the base plate and addition system.

It has been found that in order to achieve stable weight readings, it is important for the widest diameter of the vessel that is supported by the vessel legs to be less than the diameter of a circle drawn through the feet of the legs. In previous designs, the diameter of the circle of the loadcells has been very close to, or even less than the maximum diameter of the vessel that is supported by the vessel legs.

The addition system comprises three or more legs, each having an uppermost section, that is attached to the vessel, and a foot. The legs are preferably installed such that they splay out of the vessel in the manner of the legs of a spider in order to increase the stability of the weight reading. In this arrangement, the horizontal distance between the uppermost section of each of the legs which connect to the vessel is preferably shorter than the horizontal distance between the feet of each of the legs. Preferably, each leg comprises an I-beam structure. The addition system is also preferably made more stable by welding cross-bracing in at least two of the three spaces between adjacent legs.

One way of describing and quantifying this arrangement is to draw a circle in a horizontal plane through the uppermost section of each of the three legs. This circle will have a radius r1. A second circle is then drawn in a horizontal plane through the feet of each of the three legs. This circle has a radius r2. The ratio of r2 to r1 can be used to describe the degree of splaying of the legs. Preferably, the ratio of r2:r1 is between 1.1 to 1.3, with a r2:r1 ratio between 1.14 and 1.18 more preferable. Larger values than this can further increase the stability of the weight reading, but would result in additional expense from extra bracing, and would require a significantly larger footprint for the addition system.

The one or more weighing devices are mounted on the base plate and support the legs of the addition system, such that the legs of the addition system connect to the base plate through the mounted weighing devices. The advantage of mounting the load cells at this location is added stability in weighing the filled vessel.

In a preferred embodiment of the invention, the foot of each leg is also connected to a jacking system. Preferably, the jacking system consists of an extension piece that extends from the foot of each leg, and the extension piece accommodates a jacking bolt. The jacking bolt of each leg's extension piece is secured into a securing mount that is supported by the base plate, and the jacking bolt can be rotated to lift the legs off of the weighing device. The jacking bolts allow the weighing devices (eg, loadcells) to be installed when the addition system arrives on site, or at any future time when the weighing devices may need to be replaced.

The jacking system may additionally comprise a locking bolt that can be used to secure the extension piece to the securing mount during transportation of the addition system. This allows for the shipping of the entire addition system without risk of harm to the addition system or the weighing devices.

Preferably, the locking bolt is secured to a locking nut on the securing mount of the base plate. The locking nut is preferably welded to the securing mount. When the addition system is under transportation, the locking bolt can be tightened to the locking nut. This gives a positive locking of the load cell mount during transportation.

The locking bolt also allows the addition system to be secured when a weighing device is being repaired or replaced.

Preferably, the vessel also contains a filter to prevent dust emissions to atmosphere, and to prevent valuable catalyst being lost from the process during venting and refilling. Such a filter may be a pleated paper or pleated polyester filter, but preferably it is a sintered metal filter. Such a filter may consist of multiple small elements, or a single filter cartridge. Unfortunately, one of the drawbacks of using such filters is that they are usually installed in a vertical orientation to allow any collected dust to fall off easily. This takes up a lot of vessel volume, making the vessel design larger than would normally be needed.

Preferably in this invention, it has been found that a single sintered metal filter element installed in the horizontal orientation can be used, providing much more usable space inside the vessel, and significantly reducing dust emissions from the loader.

In order to allow the filter to be installed in this unusual horizontal configuration, the vessel preferably comprises a first and a second opening (or nozzle). The first opening of the vessel is connected to an exhaust path. In the first opening in the vessel, the filter is installed and sealed such that exhaust passes through the filter before being exhausted to atmosphere. The second opening is preferably installed on the vessel directly opposite the first opening in which the filter in installed. The second opening is utilized to support the filter in a horizontal manner within the vessel. The second opening comprises a supporting means which also allows the filter to rotate in a circular manner. In a preferred embodiment, a blind flange within the second opening is connected to a spring-loaded, cap which is attached to the end of the filter. The cap may be a half-spherical piece of resilient, slippery material. The slippery material is preferably a polymeric material such as polytetrafluoroethylene (PTFE). This allows the end of the filter element to rest inside the supporting means, and prevents excessive flexing and strain on the filter element. The spring loading ensures that any vibration of the far end will be taken care of by the spring tension so that any damage is prevented.

An alternative means of supporting the horizontal filter comprises two or more rigid support bars that surround the horizontal filter element. In this alternative, the vessel comprises a first opening that is connected to an exhaust path exiting the vessel and the filter is installed and sealed in the first opening in the vessel. The filter is installed and sealed such that exhaust passes through the filter before passing to the exhaust path and then being exhausted to atmosphere. The first opening contains a securing plate. Each of the two or more rigid support bars surrounding the horizontal filter element are attached into a securing plate of the first opening. An end cap is attached to the opposite end of the horizontal filter from the first opening, and the support bars are attached to the end cap to firmly hold the horizontal filter element in place. The end cap is optionally attached to a spring mechanism such as described above.

The addition system preferably contains piping. The piping comprises a first valve for transferring the particulate material to the industrial process. Preferably, the first valve is a metering valve. Suitable metering valves include a rotating disk design, such as those provided by the Everlasting Valve Company, the Thomson Valve II or the Teravalve XL. Preferably, the addition system also comprises a metering device interfaced with the vessel. The piping also comprises a second valve for transferring a first stream of pressurized gas from a source of pressurized gas to the vessel.

The vessel is capable of being pressurized and de-pressurized. The pressure in the addition system is preferably controlled at a constant level, as this affects the accuracy of the indicated weight. If the pressure of the gas supply cannot be relied on to be constant, then this pressure control can be accomplished by using a mechanical pressure regulator, or it can be accomplished electronically using the controller.

The depressurization of the vessel is preferably provided using a vacuum ejector. Preferably, the gas supply to the vessel is used to power the vacuum ejector. The vessel is preferably depressurized in order to refill the vessel when it becomes empty.

Preferably, the piping comprises solid metal piping with flexible hosing and quick disconnect couplings at the boundaries of the addition system skid. The flexible hoses and tubing prevent the measured weight of the vessel being affected by external loads, for example any loads applied to the frame, or to the connecting piping. This results in more accurate weight readings, and thereby more precise additions. The use of quick disconnect couplings allows for easy disassembly of the piping from the vessel in order to refill the addition system from different sources.

The addition system of the invention provides numerous advantages.

FIG. 1 illustrates the addition system (10) of the invention, comprising a vessel (11), weighing devices (12) shown as load cells, supported on a base (14). The legs (13) in the shape of I-beams are shown, as well as the two cross supports (15) which are shaped to accommodate a forklift in order to lift the entire addition system.

FIG. 2 illustrates the jacking system of the invention. The base of the leg (21) is lifted off the weighing device (27) and base plate (28), through the use of an extension piece (22) that is connected to the bottom of the leg (21). The jacking bolt (23) is attached to a securing mount (26) and turned to lift the extension piece off the securing mount in order to lift the vessel. A locking bolt (24) and locking nut (25) are also shown. When the locking bolt is secured to the locking nut, the addition system is locked in place for transportation purposes.

FIG. 3 illustrates one embodiment utilizing a horizontal filter (31), with a first opening (32) connected to an exhaust path (not shown) and second opening (33) on the vessel. The horizontal filter (31) is attached to a plate (36) that is connected to the first opening (32). The second opening comprises a supporting means which also allows the filter to rotate in a circular manner. The supporting means includes a spring mechanism (35) that is connected to a blind flange within the second opening (33) and cap (34) which attaches to the filter. The cap is a half-spherical piece of resilient, slippery material.

FIG. 4 illustrates an alternative embodiment for securing a horizontal filter (41) in a vessel. The horizontal filter (41) is supported using four rigid support bars (42, only three of which are shown in the figure) surrounding the filter. One end of each support bar (42) is attached into a plate (43) at the first opening of the vessel where the filter is attached. An end cap (44) is attached to the opposite end of the filter (41), and the support bars (42) are attached to the end cap (44) to firmly hold the horizontal filter element (41) in place. The end cap is optionally attached to a spring mechanism similar to that illustrated in FIG. 3.

FIG. 5 shows a vacuum ejector (52) for depressurizing the vessel (51). The vacuum ejector is connected to a silencer (53) for minimizing noise.

We claim:

1. An addition system for introducing particulate material into an industrial process, said addition system comprising:
   (a) a vessel for holding the particulate material, wherein the vessel has a top and a bottom;
   (b) one or more weighing devices;
   (c) a controller for controlling operation of the addition system;
   (d) a base plate to support the vessel and optionally the controller; and
   (e) three or more legs, each leg having an uppermost section that connects to the vessel and a foot that is connected to the base plate, wherein
   the one or more weighing device are mounted on the base plate and support the legs of the vessel;
   the widest diameter of the vessel is less than the diameter of a circle drawn through the feet of the legs;
   the vessel contains a sintered metal filter installed in the horizontal orientation to prevent dust emissions;
   the vessel comprises a first and a second opening, the first opening of the vessel is connected to an exhaust path exiting the vessel and the sintered metal filter is installed and sealed in the first opening in the vessel, the sintered metal filter is installed and sealed such that exhaust passes through the sintered metal filter before passing to the exhaust path and then being exhausted to atmosphere; and
   the second opening is installed on the vessel directly opposite the first opening and is utilized to support the sintered metal filter in a horizontal manner within the vessel.

2. The addition system of claim 1, wherein the vessel comprises a quick release hatch at the top of the vessel or on a side of the vessel.

3. The addition system of claim 1, wherein the bottom of the vessel is cone-shaped.

4. The addition system of claim 1, wherein the one or more weighing devices comprises load cells.

5. The addition system of claim 1, wherein the base plate is comprised of a solid plate of metal.

6. The addition system of claim 1, wherein the base plate comprises two cross members.

7. The addition system of claim 1, wherein the addition system comprises a jacking system.

8. The addition system of claim 1, wherein the foot of each leg is connected to a jacking system which comprises an extension piece that extends from the foot of each leg, and the extension piece accommodates a jacking bolt that may be secured to a securing mount that is supported on the base plate.

9. The addition system of claim 8, wherein the jacking system additionally comprises a locking bolt that is capable of securing the extension piece to the securing mount.

10. The addition system of claim 9, wherein the locking bolt is capable of being secured to a locking nut on the securing mount.

11. The addition system of claim 1, wherein the second opening comprises a supporting means which allows the filter to rotate in a circular manner, wherein the second opening contains a blind flange within the opening and the bind flange is connected to a spring-loaded cap which is attached to the end of the filter.

12. The addition system of claim 11, wherein the cap is a half-spherical piece of resilient, slippery material.

13. The addition system of claim 1, wherein the vessel further comprises a vacuum ejector to depressurize the vessel.

14. The addition system of claim 1, wherein the controller comprises a micro-PLC.

15. The addition system of claim 1, further comprising a metering device interfaced with the vessel and configured to provide a metric indicative of an amount of particulate material transferred from the vessel to the industrial process.

16. The addition system of claim 1, wherein the industrial process is a fluid catalytic cracking process.

17. An addition system for introducing particulate material into an industrial process, said addition system comprising:

(a) a vessel for holding the particulate material, wherein the vessel has a top and a bottom;
(b) one or more weighing devices;
(c) a controller for controlling operation of the addition system;
(d) a base plate to support the vessel and optionally the controller; and
(e) three or more legs, each leg having an uppermost section that connects to the vessel and a foot that is connected to the base plate, wherein the one or more weighing device are mounted on the base plate and support the legs of the vessel;

the widest diameter of the vessel is less than the diameter of a circle drawn through the feet of the legs;

the vessel contains a sintered metal filter installed in the horizontal orientation to prevent dust emissions;

the vessel comprises a first opening, the first opening of the vessel is connected to an exhaust path exiting the vessel and the sintered metal filter is installed and sealed in the first opening in the vessel, the sintered metal filter is installed and sealed such that exhaust passes through the sintered metal filter before passing to the exhaust path and then being exhausted to atmosphere, wherein the sintered metal filter is supported by two or more rigid support bars surrounding the horizontal sintered metal filter, with one end of each support bar being attached into a securing plate of the first opening and the other end of the support bar attached to an end cap at the opposite end of the horizontal sintered metal filter.

\* \* \* \* \*